(12) United States Patent
Hanson (10) Patent No.: US 6,868,515 B2
(45) Date of Patent: Mar. 15, 2005

(54) FORMATTING METHOD AND APPARATUS FOR A DIRECT ACCESS STORAGE DEVICE

(75) Inventor: Weldon Mark Hanson, Rochester, MN (US)

(73) Assignee: Hitachi Global Storage Technologies Netherlands BV (NL)

( * ) Notice: Subject to any disclaimer, the term of this patent is extended or adjusted under 35 U.S.C. 154(b) by 560 days.

(21) Appl. No.: 09/905,464

(22) Filed: Jul. 13, 2001

(65) Prior Publication Data

US 2003/0014708 A1 Jan. 16, 2003

(51) Int. Cl.[7] .............................................. H03M 13/00
(52) U.S. Cl. ...................................................... 714/755
(58) Field of Search ................................ 714/755, 763, 714/769, 758; 360/26

(56) References Cited

U.S. PATENT DOCUMENTS

| | | | |
|---|---|---|---|
| 4,974,197 A | 11/1990 | Blount et al. | 709/234 |
| 5,133,060 A | 7/1992 | Weber et al. | 711/113 |
| 5,210,660 A | 5/1993 | Hetzler | 360/51 |
| 5,237,675 A | 8/1993 | Hannon, Jr. | 710/68 |
| 5,283,646 A | 2/1994 | Bruder | 375/240.12 |
| 5,341,387 A | 8/1994 | Nguyen | 714/788 |
| 5,343,340 A | 8/1994 | Boutaghou et al. | |
| 5,388,013 A | 2/1995 | Nakamura | 360/48 |
| 5,442,492 A | 8/1995 | Cunningham et al. | |
| 5,535,369 A | 7/1996 | Wells et al. | 711/171 |
| 5,619,539 A | 4/1997 | Coker et al. | 275/341 |
| 5,689,532 A | 11/1997 | Fitzpatrick | |
| 5,742,443 A | 4/1998 | Tsao et al. | 360/50 |
| 5,857,002 A | 1/1999 | Melas | 375/290 |
| 5,911,150 A | 6/1999 | Peterson et al. | 711/162 |
| 5,949,831 A | 9/1999 | Coker et al. | |
| 6,072,410 A * | 6/2000 | Kim | 341/81 |
| 6,505,320 B1 * | 1/2003 | Turk et al. | 714/755 |
| 6,516,443 B1 * | 2/2003 | Zook | 714/792 |

OTHER PUBLICATIONS

IBM Technical Disclosure Bulletin, vol. 33, No. 9, Feb. 1991, pp. 158–164.

* cited by examiner

Primary Examiner—Shelly A Chase
(74) Attorney, Agent, or Firm—Crawford Maunu PLLC (57) ABSTRACT

A system and method for transferring data between a read/write transducer and a data storage medium involves encoding a first set of data blocks of a data field according to a first coding constraint for storage on the data storage medium. The data blocks have a predetermined block size. The data field includes a last data block that stores fewer data bytes than that accommodated by the predetermined block size. The last data block is encoded according to a second coding constraint for storage on the data storage medium, such that no pad bytes are required to complete encoding of the last data block. The first set of data blocks transferred from the data storage medium are decoded according to the first coding constraint, and the last data block transferred from the data storage medium is decoded according to the second coding constraint.

32 Claims, 9 Drawing Sheets

FORMATTING METHOD AND APPARATUS FOR A DIRECT ACCESS STORAGE DEVICE

FIELD OF THE INVENTION

The present invention relates generally to data storage systems and, more particularly, to a system and method for encoding and decoding data blocks that eliminates the need for pad bytes.

BACKGROUND OF THE INVENTION

A typical data storage system includes a magnetic medium for storing data in magnetic form and a transducer used to write and read magnetic data respectively to and from the medium. A typical disk storage device, for example, includes one or more data storage disks coaxially mounted on a hub of a spindle motor. The spindle motor rotates the disks at speeds typically greater than several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation.

In a typical data storage device, such as a direct access storage device (DASD) or other magnetic or optical storage device, data is typically stored in data sectors. In addition to storing customer data, each data sector typically includes a number of fields that store specific types of information that facilitate recovery of customer data during the readback process. Such fields may, for example, include one or more synchronization fields, an error correction code (ECC) field, a cyclic redundancy code (CRC) field, and a pad field.

Conventional data channel detector implementations typically require additional data or "pad" to be written to a data sector following writing of the customer data and ECC fields in order to allow the channel's detector to decode the last bytes of data written to the sector. The purpose of the pad is to provide sample values to the channel's detector and/or parity circuits for purposes of resolving pending decisions at the end of a data read operation.

In state of the art DASD read/write channels, parity encoding schemes are employed which use large block sizes to improve code rate efficiency. In such schemes, the encoding process does not require a full block of data be written to the disk. In accordance with current decoding processes which employ parity information to correct errors in the block, however, it is a requirement that a full block of data be read prior to transferring customer data.

The use of large block sizes, such as 12 byte blocks in certain designs, limits the granularity of available sector sizes. In cases where the needed number of bytes does not fit a modulus of the block size, for example, an appropriate number of pad bytes are added to meet the requirement. If the pad was not added, a read operation would return erroneous data due to the last block being incomplete and would most likely have incorrect parity information resulting in miscorrected data being transferred out.

It is appreciated by those skilled in the art that this pad represents wasted space that could otherwise be allocated for storing customer data or other needed information. Inclusion of such pad degrades format efficiency. In current DASD designs, there is no practicable way to completely eliminate the need for pad due to varied data rates, split sectors, and customer requests for non-standard sector sizes, among other reasons. The use of smaller block sizes has several disadvantages as well, including lower code rate efficiency and/or degraded error rate performance, both of which degrade format efficiency.

There is a need for an improved data storage formatting approach which provides for increased data sector format efficiency. There exists a further need for such an approach that provides for increased customer data storage capacity, and one that allows designers to implement more efficient coding schemes without incurring loss of format efficiency due to the requirement to add pad at the end of a data sector. The present invention fulfills these and other needs.

SUMMARY OF THE INVENTION

The present invention is directed to a system and method of transferring data between a read/write transducer coupled to a data channel and a data storage medium. According to an embodiment of the present invention, a first set of data blocks of a data field is encoded according to a first coding constraint for storage on the data storage medium. The data blocks have a predetermined block size and the data field includes a last data block that stores a number of data bytes fewer than that accommodated by the block size of the last data block. The last data block is encoded according to a second coding constraint for storage on the data storage medium, such that no pad bytes are required to complete encoding of the last data block. The first set of data blocks transferred from the data storage medium are decoded according to the first coding constraint, and the last data block transferred from the data storage medium is decoded according to the second coding constraint.

The first coding constraint includes a first modulo requirement, and the second coding constraint includes a second modulo requirement differing from the first modulo requirement. For example, the first coding constraint typically includes a first modulo requirement corresponding in number to a number of data bytes defining the predetermined block size, and the second coding constraint includes a second modulo requirement corresponding in number to a number of data bytes stored in the last data block. The second modulo requirement preferably has an associated modulo number less than that of the first modulo requirement. The second coding constraint may vary relative to the number of data bytes stored in the last data block. Encoding the last data block may or may not involve providing error detection coverage for the last data block.

Decoding the data field involves detecting a start of the last data block. Use of the first coding constraint is discontinued in response to detecting the start of the last data block. The second coding constraint is used to decode the last data block in response to detecting the start of the last data block. Detecting the start of the last data block may involve detecting a change of state of a read gate input into the data channel. Detecting the start of the last data block may also involve using a count of data field bytes to determine the start of the last data block.

According to another embodiment of the present invention, an apparatus for processing information transferred between a read/write transducer coupled to a data channel and a data storage medium includes an encoder and a decoder. The encoder encodes a first set of data blocks of a data field according to a first coding constraint for storage on the data storage medium. The data blocks have a predetermined block size, and the data field includes a last data block that stores a number of data bytes fewer than that accommodated by the block size of the last data block. The encoder encodes the last data block according to a second coding constraint for storage on the data storage medium, such that no pad bytes are required to complete encoding of the last data block. A subset of circuitry of the encoder is preferably used to encode the last data block.

The decoder decodes the set of data blocks transferred from the data storage medium according to the first coding constraint, and decodes the last data block transferred from the data storage medium according to the second coding constraint. A subset of circuitry of the decoder is preferably used to decode the last data block. The first and second coding constraints include differing first and second modulo requirements, respectively, as described above.

The decoder may incorporate or be coupled to a detector that detects a start of the last data block. The detector may detect the start of the last data block by detecting a change of state of a read gate input into the data channel. Alternatively, or in addition, a counter may be coupled to the detector. In this configuration, the detector detects the start of the last data block using a count of data field bytes indicated by the counter. The decoder may further be coupled to an error correction circuit. The error correction circuit produces error correction data, such a parity information. The encoder may or may not encode the last data block to include the error correction data for the last data block.

In accordance with a further embodiment, an encoder and decoder as described above may be incorporated into a data storing system. In this embodiment, the data storage system includes at least one data storage medium, a transducer supported by a support structure in proximity with the medium, and an actuator that provides relative movement between the transducer and the medium. Circuitry for processing information transferred between the transducer and the data storage medium is also provided, such circuitry including an encoder and decoder as described above.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 1:
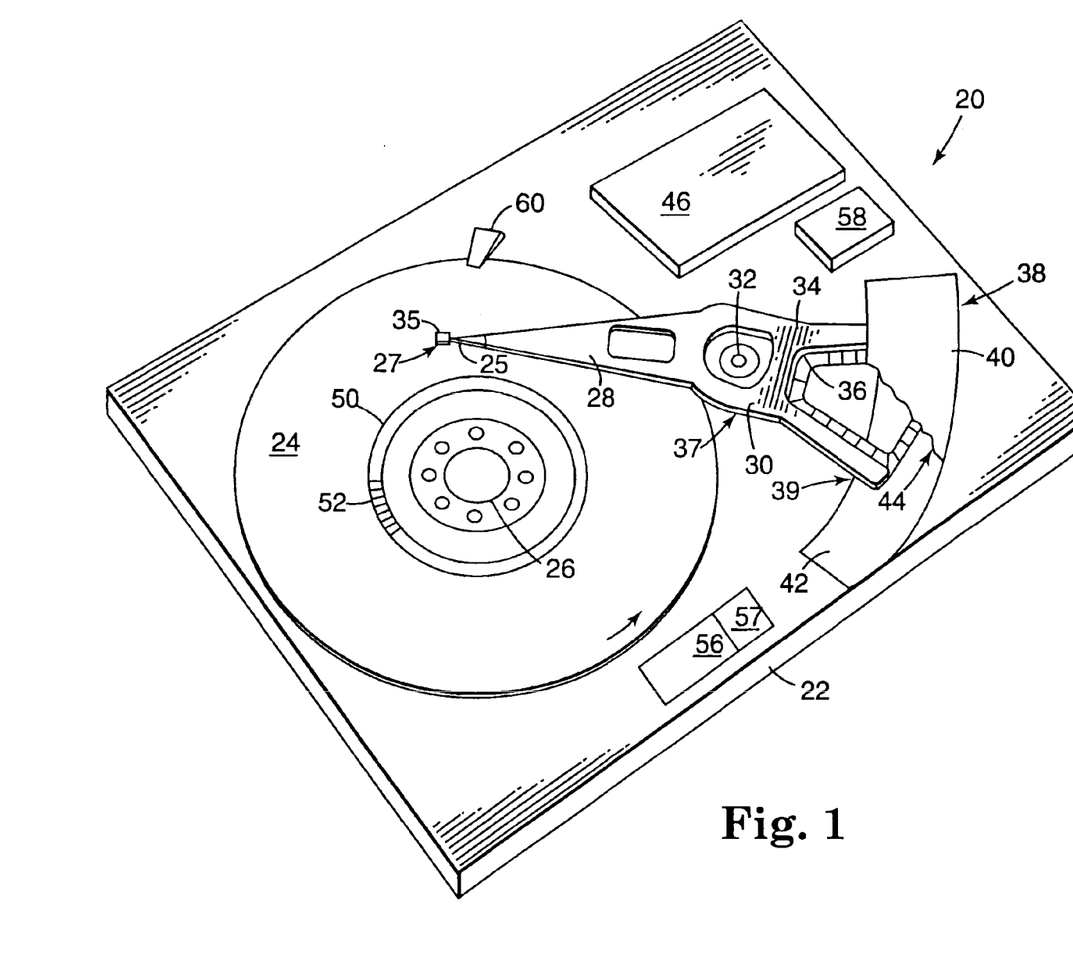
FIG. 1 is a top perspective view of a disk drive system with its upper housing cover removed.
Figure 2:
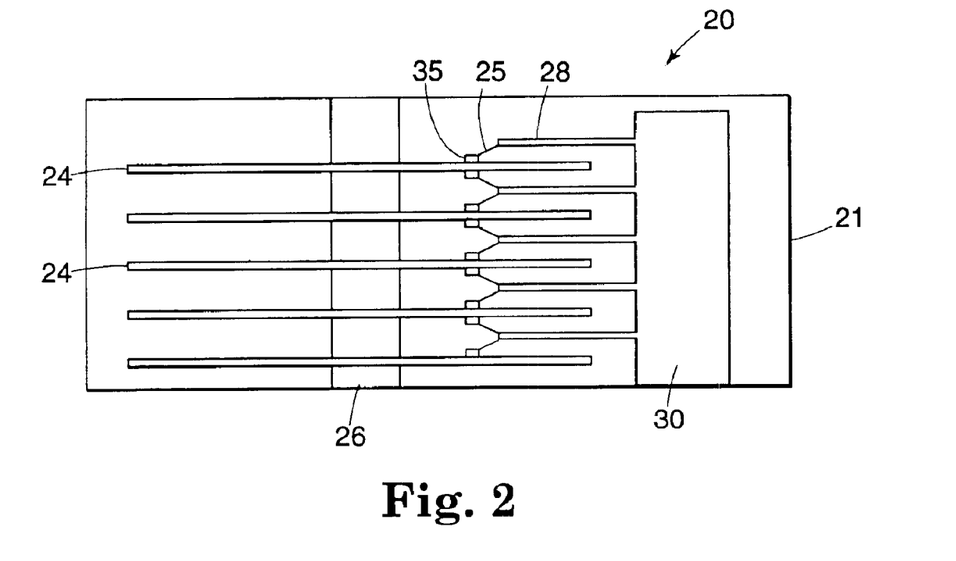
FIG. 2 is a side plan view of a disk drive system comprising a plurality of data storage disks.

Referring to the drawings, and more particularly to FIGS. 1 and 2, there is illustrated a data storage system 20 within which methods and apparatuses according to the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24 is typically less than 40 nm.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38.

The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

An apparatus and method according to the present invention are well suited for implementation in-situ a disk drive system of the type described above with reference to FIGS. 1 and 2. It is understood that the invention is not limited to the operating environment described in the above discussion or that provided hereinbelow.

An apparatus and method in accordance with the principles of the present invention generally provide for improved track format efficiency in a direct access storage device by eliminating the need for pad otherwise required to complete encode and decode operations. More particularly, improved track format efficiency is achieved by eliminating the need for pad otherwise required to complete encode and decode operations when the data stored within a data sector does not match the modulo byte requirement of the encoding scheme.

Pad information typically contains the remainder of an encode/decode block including information required to complete parity correction to the block (block coding pad) and also additional bytes (Viterbi closure pad) required for completion of the data detection operation including finalizing pending decisions within the detector (e.g., Viterbi detector) logic. Employment of a formatting approach consistent with the principles of the present invention provides for greater flexibility to the user of the data channel in designing the track format of a disk drive system without having lost storage efficiency due to the requirement to pad additional bytes to the end of a data sector in the event that the data stored within the data sector does not match the modulo byte requirement of the encoding scheme.

Several advantages are realizable by employment of a formatting scheme of the present invention, including, for example, increased flexibility to the disk drive system designer in defining the track format without loss of track efficiency at various zones, which can provide an appreciable increase in linear bit advantage. Also, existing encoding/decoding circuitry may be reused to obtain a format advantage without loss of signal-to-noise ratio (SNR) improvement of the parity correction. Because such encoding/decoding circuitry already exists within the encode/decode structure of the data channel, such circuitry need only be modified to realize the format advantage of the present invention. Further, read path latency is reduced at the end of a read operation by concluding read path decisions without having to process additional bytes of data to obtain parity coverage.

Figure 3A:
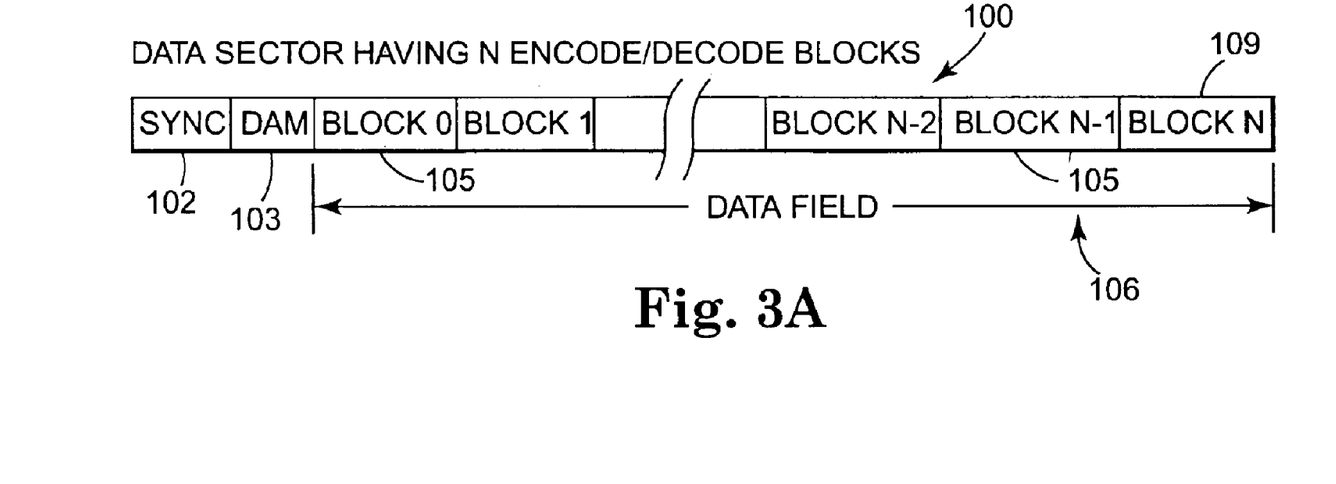
FIG. 3 illustrates various fields of a data sector including customer data blocks and pad which is advantageously eliminated by implementing the present invention.
Figure 3B:
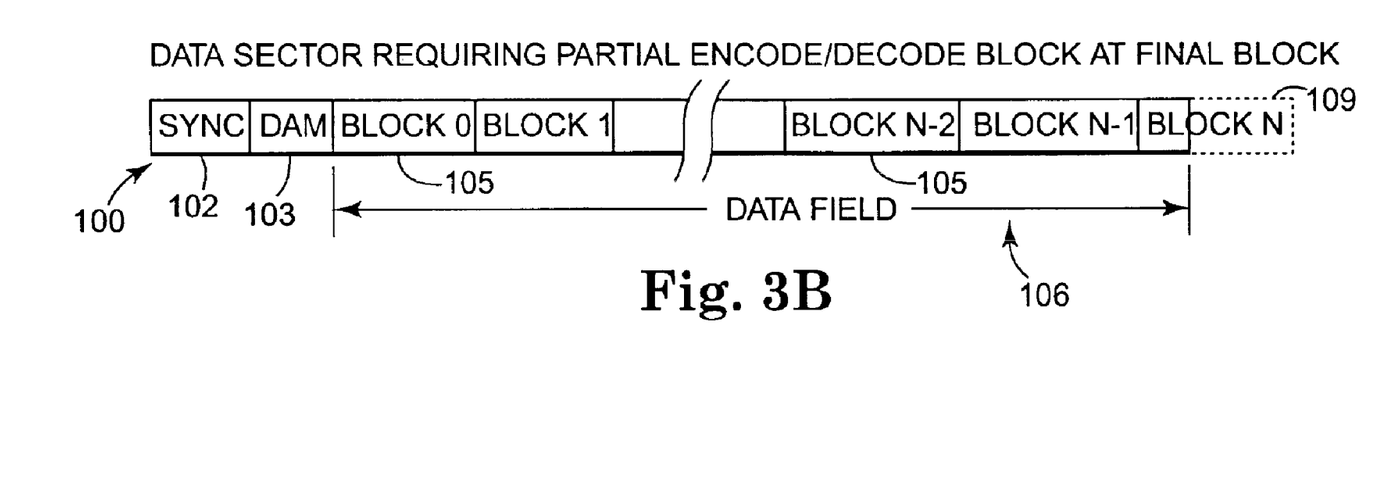

Referring now to FIGS. 3A and 3B, there is depicted a typical data sector 100 of a data track provided on a data storage disk. The data sector 100 is shown to include a data field 106 comprising a number of data blocks 105, including a last data block 109. The data sector 100 preferably conforms to a sector format with large block parity codes (e.g., 12 bytes per block). The data sector 100 includes a sync field 102, which includes synchronization patterns that allow the channel VFO to acquire the clock frequency, and a data address mark (DAM) field 103, which includes a pattern that identifies the start of the encoded customer data field 106. Customer data is stored in the data field 106.

The data field 106 is shown to include blocks 105 of data bytes which would correspond to the encoding of a fixed number of bytes into a pattern suitable to be written to the storage media to code constraints inclusive of timing, gain loop control, and error correction redundancy (i.e., parity). The data field 106 in this context includes customer data and error correction code (ECC). In accordance with conventional formatting schemes, the data field 106 also includes any pad requirement needed to complete detection and correction of errors occurring with the data field 106.

FIG. 3A illustrates a case in which the total number of data bytes used in the data field is consistent with the modulo byte requirement of the encoding circuit. FIG. 3B, in contrast, illustrates a case in which the total number of data byes does not meet the modulo constraint of the encoding circuit. In such a case, storing this data would require padding of additional bytes 109 to the data field 106 to complete the modulo byte requirement.

A data track formatting methodology of the present invention advantageously eliminates the need for a pad field 109 otherwise required at the end of a data sector to complete readback signal decoding for customer data patterns. Elimination of the pad field improves format efficiency and allows for more customer data to be stored on the media per unit area, and allows designers to implement more efficient coding schemes without incurring loss of format efficiency due to the requirement to add pad at the end of a data sector.

Figure 4:
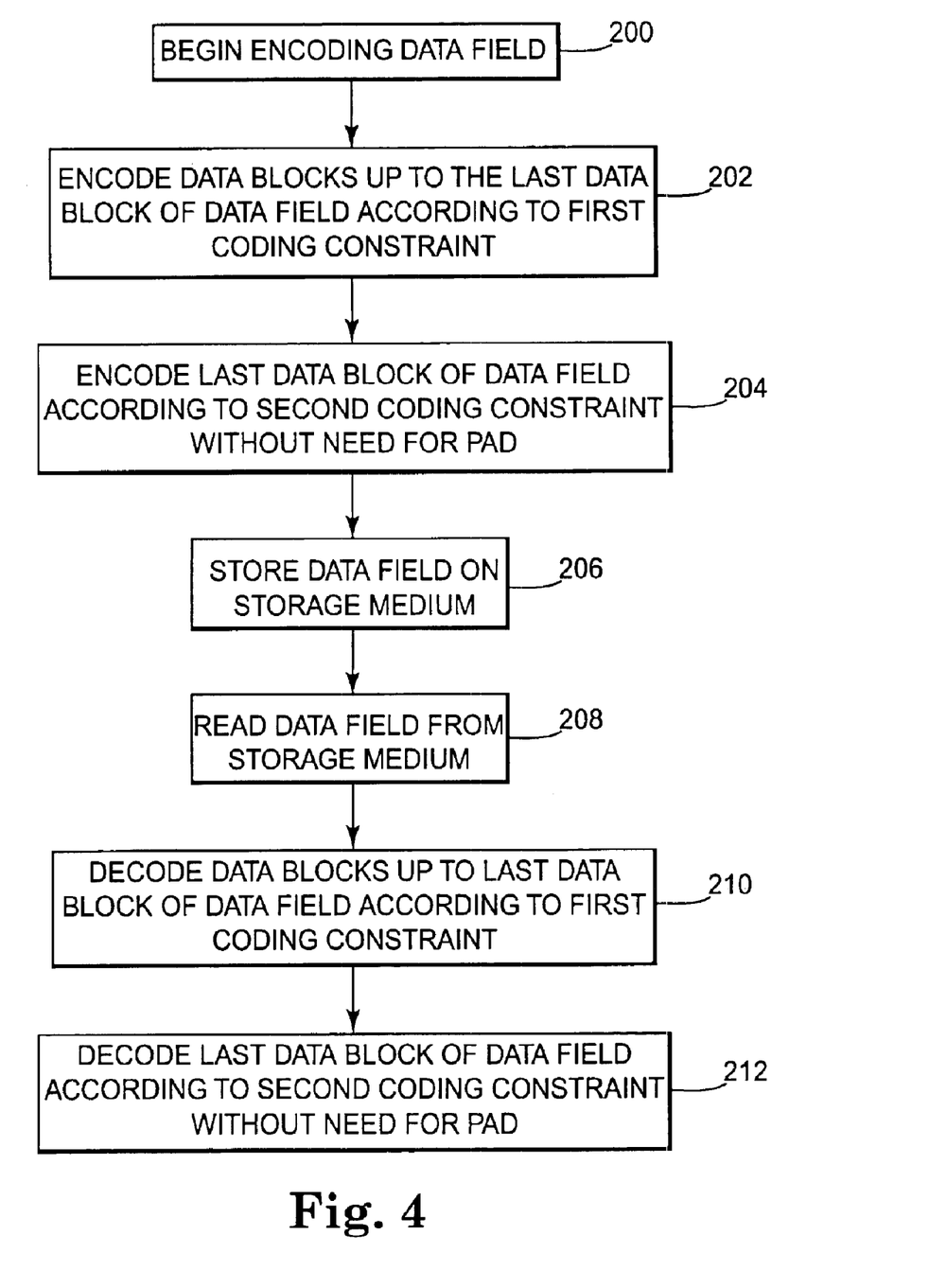
FIG. 4 illustrates various operations associated with encoding and decoding customer data in accordance with an embodiment of the present invention.

FIG. 4 depicts several operations of a data track formatting methodology according to an embodiment of the present invention. According to this embodiment, encoding of a data field is initiated 200. The data field includes a number of data blocks, including a last data block, of a predetermined size. The data blocks of the data field up to the last data block are encoded 202 according to a first coding constraint. The last data block of the data field is encoded 204 according to a second coding constraint. The second coding constraint provides for the encoding of a partial last data block without the need for pad. It is noted that the last data block may include or exclude parity information. The encoded data field is then transferred 206 to a data storage medium as part of a write operation for storage thereon.

At some later point in time, the encoded data field is transferred 208 from the storage medium as part of a read operation. The data blocks of the encoded data field up to the last data block are decoded 210 according to the first coding constraint. The last data block of the data field is decoded 212 according to the second coding constraint, without the need for processing pad data. Error correction may be performed as part of the read operation for the data field, including the last data block if parity information is included with the last data block.

Figure 5:
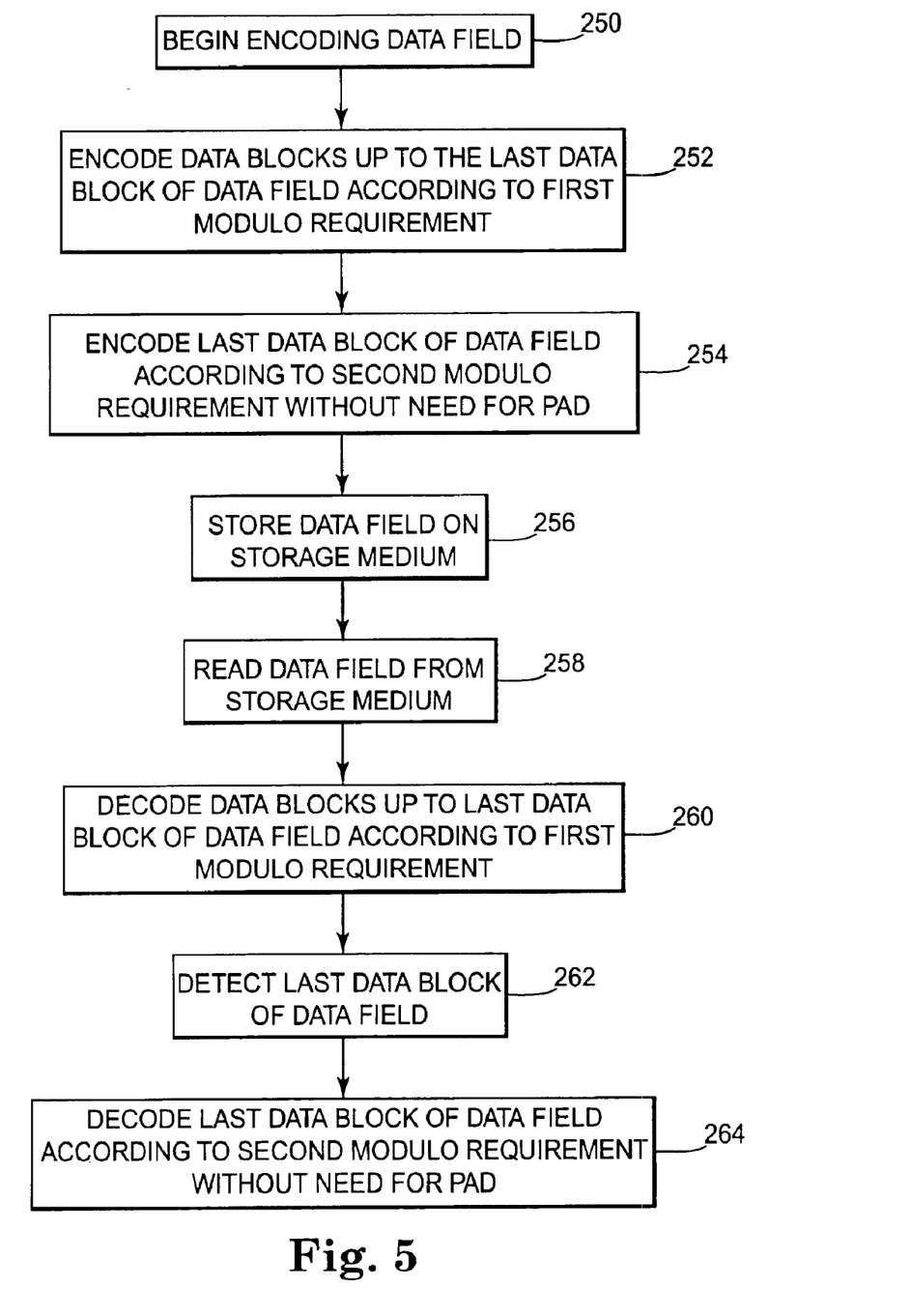
FIG. 5 illustrates various operations associated with encoding and decoding customer data in accordance with another embodiment of the present invention.

FIG. 5 depicts several operations of a data track formatting methodology according to another, more particular, embodiment of the present invention. According to this embodiment, encoding of a data field is initiated 250, and the data blocks of the data field up to the last data block are encoded 252 according to a first modulo byte requirement. The last data block of the data field is encoded 254 according to a second modulo byte requirement. The second modulo byte requirement, as in the previous embodiment, provides for the encoding of a partial last data block without the need for pad. The last data block may include or exclude parity information. The encoded data field is then transferred 256 to a data storage medium for storage thereon.

The encoded data field is transferred 258 from the storage medium during a subsequent read operation. The data blocks of the encoded data field up to the last data block are decoded 260 according to the first modulo byte requirement. Upon detection 262 of the last data block of the data field, the last data block is decoded 264 according to the second modulo byte requirement, without the need for processing pad data. Error correction may be performed as part of the read operation for the data field, including the last data block if parity information is included with the last data block.

Detecting the last data block of a data field may be accomplished in several ways. According to one approach, a change of state of a read gate input into the data channel from an active state to an inactive state is detected. As will be discussed in greater detail below, this state change of the read gate input provides a means for detecting the start of the last data block of the data field.

A counting approach may also be employed to identify the last data block of a data sector. According to one counting approach, the data sector has a predefined size, and, with knowledge of an expected amount of data that will be read during the read operation and counting an amount of data transferred out of the data channel during the read operation, the start of the last block can be detected using the counted amount of transferred data. For example, the last block can be detected when the expected amount of data is not an integer multiple of the predefined size of the data sector (e.g., a partial last data block).

Figure 6:
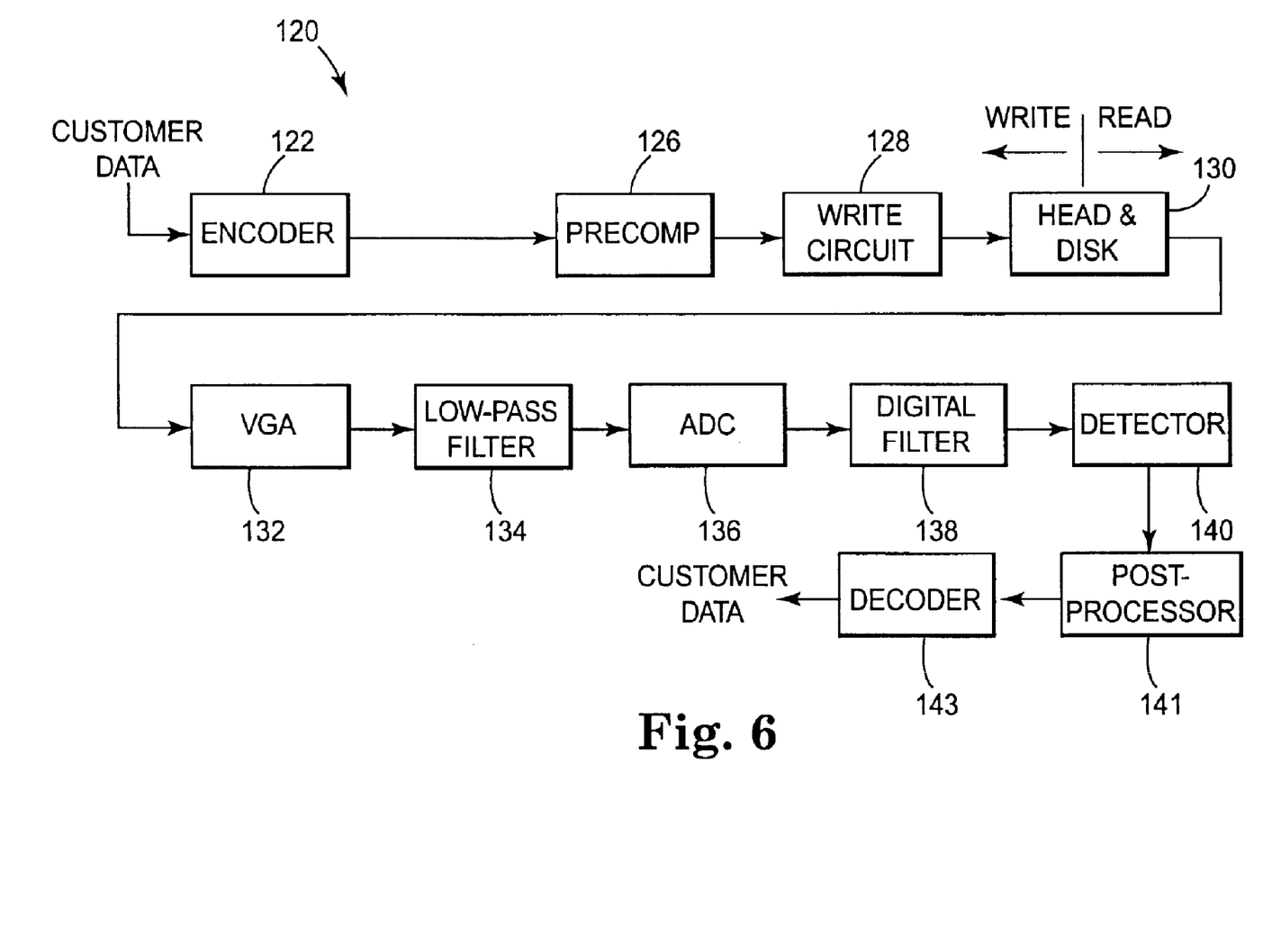
FIG. 6 illustrates various components of a data channel embodying the present invention.

Referring now to FIG. 6, there is illustrated a block diagram of a data channel of a data storage system embodying the present invention. In particular, FIG. 6 shows an embodiment of a partial-response maximum-likelihood (PRML) channel 120 which implements a track formatting methodology in accordance with the principles of the present invention. The channel 120 may be viewed as constituting a portion associated with writing data to a data storage medium and a portion associated with reading data from the medium.

Customer data to be written to the data storage medium is applied to an encoder 122 which encodes the customer data according to a pre-established coding scheme. By way of example, encoder 122 may re-map the customer data to include timing information for purposes of facilitating efficient readback signal processing, improving efficiency, and minimizing error propagation. For example, a 16/17 rate coding scheme may be employed by encoder 122 which encodes 16 customer bits to 17 channel bits to provide the requisite timing information. The encoder 122 converts the encoded binary customer data to a binary write current waveform signal.

The encoder 122 operates on the encoded customer data to enable the magnetic system to mimic a desired partial-response (PR) or extended partial-response (EPR) transfer function in the sampled readback signal. Encoder 122 typically employs a delay circuit which includes an exclusive OR (XOR) circuit to produce a binary write current waveform according to a selected partial-response signaling format. By way of example, encoder 122 may be described by a $1/(1-D^2)$ operation or by a $1/(1-D)$ operation, where D represents a unit delay operator. The encoder 122 mimics the desired partial-response transfer function characteristics by switching the write current such that each binary "1" in the data stream has a non-zero sample in the readback signal. It is understood that encoder 122 may process the encoded customer data according to any of a number of partial-response transfer function specifications, such as a class-4 partial-response (PR4) signaling specification or an extended partial-response class-4 (EPR4) signaling specification.

Encoder 122 is coupled to a precomp circuit 126 which provides an output signal to a write circuit 128 in the form of a modulated binary pulse signal. The write circuit 128 provides the modulated write current signal to a write element of a read/write transducer for writing the processed customer data to the disk surface 130.

Having described the various components and operations associated with writing data to a data storage disk, the following discussion describes various operations associated with reading data from data sectors. A read element of a read/write transducer obtains an analog readback signal from the disk surface 130. The readback signal is applied to a variable gain amplifier (VGA) 132 and the amplified readback signal is applied to a low-pass filter 134. The filtered readback signal is converted to digital form by an analog-to-digital convert (ADC) 136. The converted signal produced by ADC 136 may, for example, provide for 64 possible 6 bit sampled values.

The samples of the ADC 136 are applied to a digital filter 138, such as a 10 tap finite impulse response (FIR) digital filter. The filtered signal produced at the output of digital filter 138 preferably conforms to a selected partial-response signal format (e.g., PR4 or EPR4). The filtered signal produced by the digital filter 138 is then communicated to a Viterbi detector 140.

The Viterbi detector 140 employs a Viterbi algorithm which is used to select the "best value" for an output based upon the minimization of the error term relative to an ideal sample value. Various known Viterbi or maximum likelihood detection algorithms may be employed in connection with the present invention. The Viterbi detector 140 produces an encoded binary data stream representative of the customer data which is subject to processing by a parity post-processor 141 and a decoder 143. The decoded binary data stream representative of the customer data is then transferred to the user via the head-disk controller and interface of the disk drive system.

Figure 7:
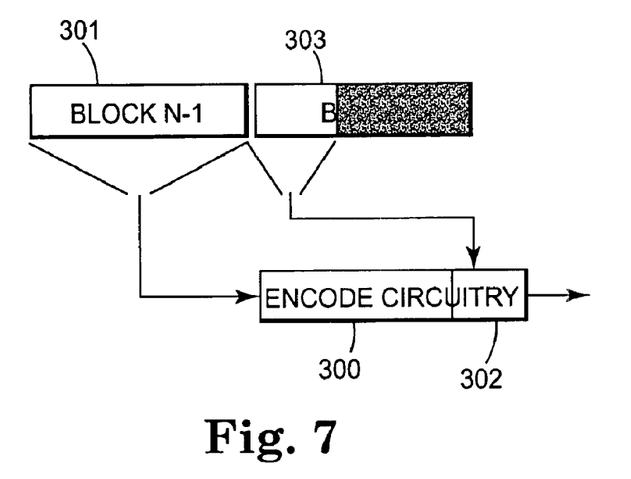
FIG. 7 illustrates an encoding scheme in accordance with an embodiment of the present invention.

Various embodiments of the present invention will now be described in greater detail with reference to FIGS. 7–12. FIG. 7 depicts the general flow of an encoding process for the final block of customer data according to an embodiment of the present invention. FIG. 7 shows two data blocks 301, 303 of a data sector, with block 303 representing the last data block of the data sector. Block 303 depicts a partial last data block in which the number of bytes stored in the last data block 303 does not match the modulo byte requirement of the encoding scheme implemented by the encoder circuitry 300. Data for this final, partial encode block 303 is encoded using a subset 302 of the encoder circuitry 300.

Encoding of large data blocks (e.g., 12 byte data blocks) typically involves the use of algorithms by which smaller blocks of data are encoded and concatenated with parity or other constraints applied to the data block as a whole. For example, according to one code implementation that utilizes 12 byte data blocks, 2 bytes of data are decoded at a time, with parity bits interspersed throughout the 12 byte block. Accordingly, embodiments of the present invention allow for usage of a subset 302 of the encoder circuitry 300 to encode the final, partial data block 303.

This subset 302 of the encoder circuitry 300 encodes the final bytes of customer data in the last data block 303 in a manner that is consistent with the code constraints, but may or may not include error correction redundancy (i.e., parity) of the final encode block 303. Use of a subset 302 of the encoding circuitry 300 advantageously allows for reuse of the circuitry 300 and use of common encode constraints.

Figure 8:
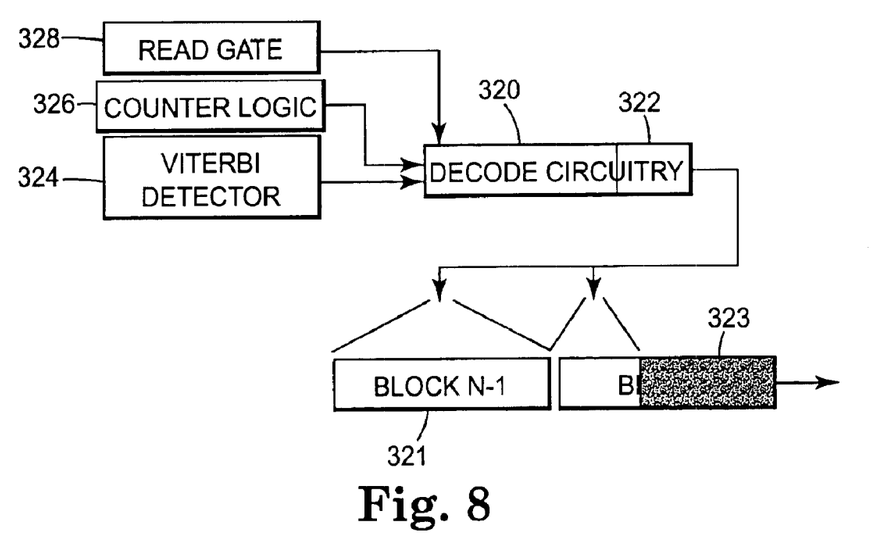
FIG. 8 illustrates a decoding scheme in accordance with an embodiment of the present invention.

FIG. 8 depicts the general flow of a decoding process for the final block of customer data encoded in a manner discussed above with regard to FIG. 7. The two last blocks 321, 323 of encoded customer data are shown in FIG. 8. According to this depiction, during a read operation, encoded data is read from the storage media and converted from an analog sequence to a digital sequence by detection circuitry, such as by a Viterbi detector 324. The encoded data stream is communicated to decoder circuitry 320 where it is re-mapped to customer data in a manner consistent with code constraints, and error correction is performed based on parity information, if the code properties include this property.

As was previously discussed, encoding of large data blocks typically involves the use of algorithms by which smaller blocks of data are encoded and concatenated with parity or other constraints applied to the data block as a whole. Accordingly, embodiments of the present invention allow for usage of a subset 322 of the decoder circuitry 320 to decode the final, partial data block 323.

FIG. 8 further illustrates a read gate input 328 and counter logic 326, each of which may be individually employed to detect the last data block of a data field. As was briefly discussed above, the state of the read gate input 328 to the data channel can be monitored by a state detector (not shown) to detect a state change of the read gate input 328 as the read gate input transitions from an active state to an inactive state. The state detector may, for example, be incorporated as part of the post processor 141 shown in FIG. 6, the decoder circuitry 320, or other component of the read channel circuitry.

When the read gate input 328 goes active, a read operation begins. When the read gate input 328 transitions to inactive, an internal timer in the channel delays the end of the read operation to account for decoder processing delay. As such, when the read gate input 328 goes inactive, the next block to be processed will be the last data block 323 of the data sector. Having detected the start of the last data block 323, a final, partial data block 323 may be decoded using the subset 322 of the decoder circuitry 320.

According to a second embodiment, counter logic 326, such as a byte counter, counts an amount of data transferred out of the data channel during the read operation and detects a start of the last data block 323 using the counted amount of transferred data and an expected amount of data to be read during the read operation. The last data block 323 may, for example, be detected as a partial, last data block where the expected amount of data to be read is not an integer multiple of a predefined size of the data sector.

Figure 9:
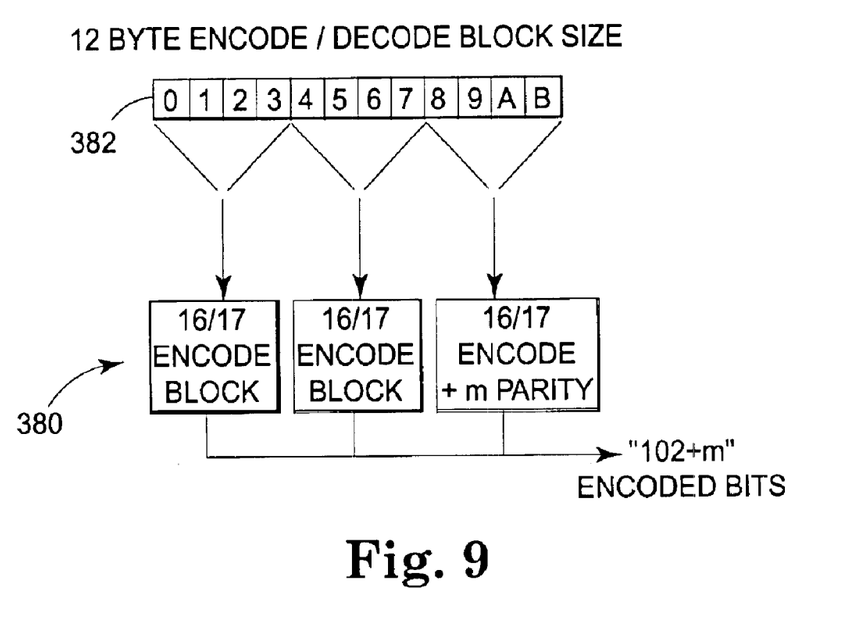
FIG. 9 illustrates a more detailed showing of an encoding scheme in accordance with an embodiment of the present invention.
Figure 10:
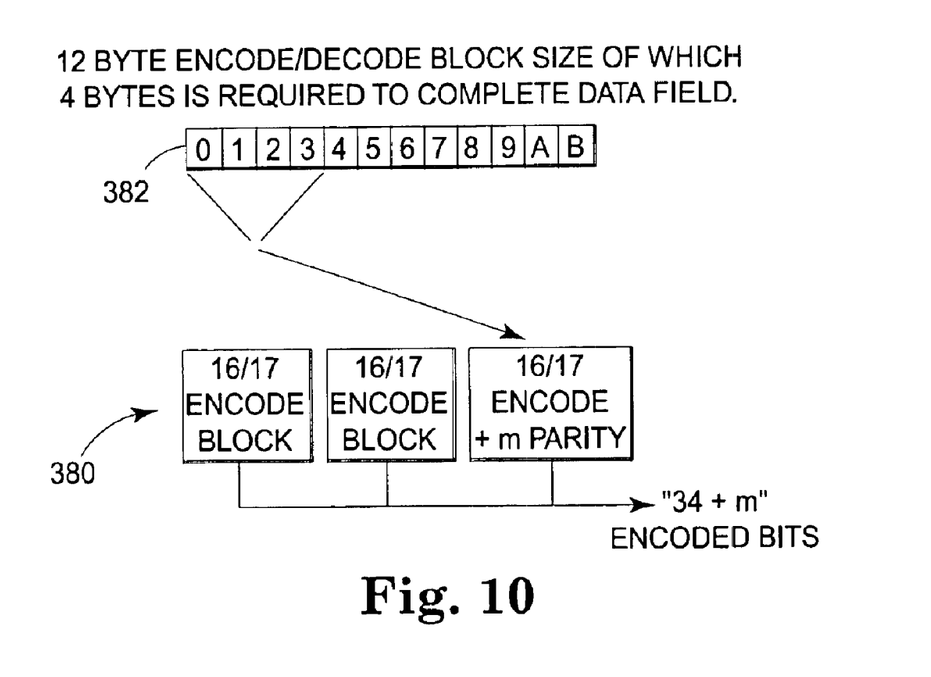
FIG. 10 illustrates encoding of customer data using a subset of encoding circuitry in accordance with an embodiment of the present invention.

FIGS. 9 and 10 illustrate an embodiment of an encoder structure that provides for the encoding of a partial, final data block without requiring additional pad data to complete the encoding process. An encoder, such as that shown in FIGS. 6 and 7, can be implemented to include encoder circuitry 380 as depicted in FIGS. 9 and 10. Encoder circuitry 380, in this illustrative embodiment, encodes 12 bytes (96 bits) of customer data into a bit stream having encoded 102 bits with inclusion of additional "m" bits of parity information. The encoder circuitry 380 typically encodes the customer data 382 in a manner in which smaller groups of bytes (e.g., bytes 0–3 and bytes 4–7) are processed and output prior to the final group of bytes (e.g., bytes 8-B). The final group of bytes are encoded in a manner consistent with constraints of the code, having added to it additional bytes of parity, thus allowing for correction of the entire 12 byte encode block. An encoded data stream comprising 102+"m" encoded bits is output from the encoder circuitry 380.

In FIG. 10, it is assumed that the final block of data to be encoded is a partial data block in which 4 bytes is required to complete the data field. As is shown in FIG. 10, encoding of the final block of data 382 can be reduced to having a modulo 4 constraint, instead of a modulo 12 constraint, by encoding the final 4 bytes of the data to meet the modulo 4 code constraint and include parity information. Inclusion of parity information to the data, including the last data block, allows errors to be corrected during read operations. As such, parity coverage is maintained over all data. It is noted that parity information may, however, be excluded from the last encode block, as was discussed previously.

Figure 11:
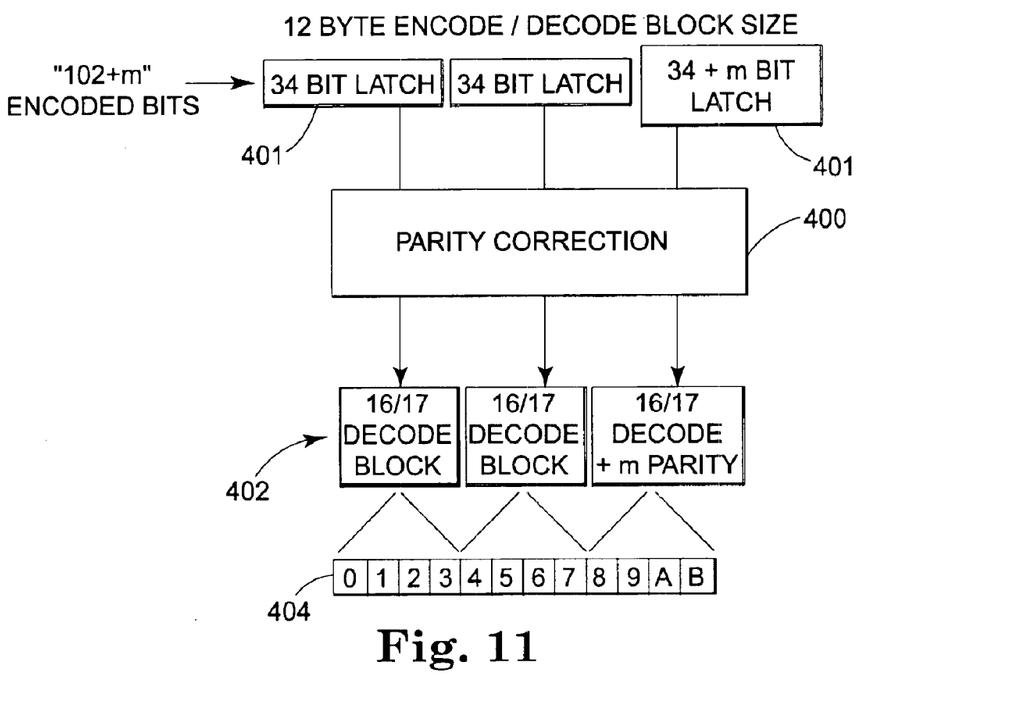
FIG. 11 illustrates a more detailed showing of a decoding scheme in accordance with an embodiment of the present invention.
Figure 12:
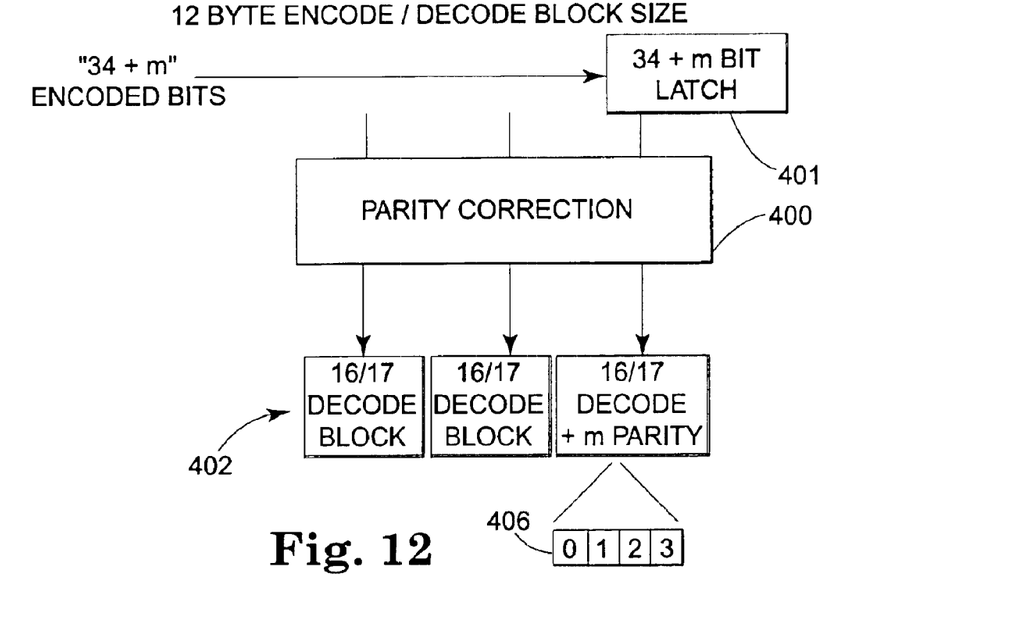
FIG. 12 illustrates decoding of encoded customer data using a subset of decoding circuitry in accordance with an embodiment of the present invention.

FIGS. 11 and 12 illustrate an embodiment of a decoder structure that provides for the decoding of a partial, final data block without requiring additional pad data to complete the decoding process. A decoder, such as that shown in FIGS. 6 and 8, can be implemented to include the decoding circuitry 402 and data correction circuitry 400 as depicted in FIGS. 11 and 12. As is show in FIG. 11, an encoded data stream (e.g., 102+"m" encoded bits) is received by a number of latches 401 (e.g., 34 bit latches and one 34+m bit latch). The number of latches 401 preferably corresponds to the number of customer data byte groupings. In the instant illustrative embodiment, three such latches 401 correspond to the three customer data byte groupings of bytes 0–3, 4–7, and 8-B, respectively. It is noted that the last latch 401 is represented as a 34+m bit latch to accommodate "m" bits of parity data of the encoded data stream.

The data correction circuitry 400 corrects transmission errors by use of parity information provided in the encoded data stream (e.g., 102+"m" encoded bits). The data correction circuitry 400 performs parity correction on the encoded data stream prior to decoding by decoding circuitry 402. The data correction circuitry 400 strips the parity bits from the encoded data stream and performs error correction operations using the stripped parity bits. After error correction has been performed, decoder circuitry 402 decodes the encoded data stream to produce a binary data stream 404 representative of the customer data.

FIG. 12 illustrates an aspect of the decoding scheme of the present invention which provides the user with the ability to decode the final block of data using a subset of the decoding and/or parity correction circuitry. This decoding scheme advantageously allows the user to decode the final bytes of a partial, last block of data of a data sector without being limited to the same modulo byte requirement (e.g., 12 byte modulo constraint) required for decoding previous data blocks of the data sector.

In the specific example depicted in FIG. 12, the final, partial "34+m" encoded bits of a read signal are captured in a latch 401. Parity correction is applied by the data correction circuitry 400 in a manner consistent with recovery of any error existing in the shortened final data block. A subset of the decoder circuitry 402 is used to decode and output the final bytes 406 of customer data. In this illustrative example, the decoder circuitry 402 employs a modulo 4 byte constraint for parity correction of the final 4 bytes of the partial, last encode block.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of transferring data between a read/write transducer coupled to a data channel and a data storage medium, the method comprising:

encoding a first plurality of data blocks of a data field according to a first coding constraint for storage on the data storage medium, the data blocks having a predetermined block size and the data field comprising a last data block that can store a number of data bytes fewer than that accommodated by the block size of the last data block;

discontinuing use of the first coding constraint in response to detecting a start of the last data block;

encoding the last data block according to a second coding constraint for storage on the data storage medium such that no pad bytes are required to complete encoding of the last data block;

decoding the first plurality of data blocks transferred from the data storage medium according to the first coding constraint; and in response to detecting the start of the last data block, decoding the last data block transferred from the data storage medium according to the second coding constraint.

2. The method of claim 1, wherein the first coding constraint comprises a first modulo requirement and the second coding constraint comprises a second modulo requirement differing from the first modulo requirement.

3. The method of claim 2, wherein the second modulo requirement has an associated modulo number less than that of the first modulo requirement.

4. The method of claim 1, wherein the first coding constraint comprises a first modulo requirement corresponding in number to a number of data bytes defining the predetermined block size, and the second coding constraint comprises a second modulo requirement corresponding in number to a number of data bytes stored in the last data block.

5. The method of claim 1, wherein the second coding constraint varies relative to the number of data bytes stored in the last data block.

6. The method of claim 1, wherein:

use of the first coding constraint is discontinued in response to detecting the start of the last data block if the last data block stores fewer data bytes than that accommodated by the block size of the last data block.

7. The method of claim 1, wherein detecting the start of the last data block comprises detecting a change of state of a read gate input into the data channel.

8. The method of claim 1, wherein detecting the start of the last data block comprises using a count of data field bytes to determine the start of the last data block.

9. The method of claim 1, wherein encoding the last data block further comprises providing error detection coverage for the last data block.

10. The method of claim 1, wherein encoding the last data block further comprises non-provision of error detection coverage for the last data block.

11. An apparatus for processing information transferred between a read/write transducer coupled to a data channel and a data storage medium, the apparatus comprising:
- an encoder for encoding a first plurality of data blocks of a data field according to a first coding constraint for storage on the data storage medium, the data blocks having a predetermined block size and the data field comprising a last data block that can store a number of data bytes fewer than that accommodated by the block size of the last data block, the encoder encoding the last data block according to a second coding constraint for storage on the data storage medium such that no pad bytes are required to complete encoding of the last data block; and
- a decoder that decodes the first plurality of data blocks transferred from the data storage medium according to the first coding constraint, the decoder decoding the last data block transferred from the data storage medium according to the second coding constraint.

12. The apparatus of claim 11, wherein a subset of circuitry of the encoder encodes the last data block.

13. The apparatus of claim 11, wherein a subset of circuitry of the decoder decodes the last data block.

14. The apparatus of claim 11, wherein the first coding constraint comprises a first modulo requirement and the second coding constraint comprises a second modulo requirement differing from the first modulo requirement.

15. The apparatus of claim 14, wherein the second modulo requirement has an associated modulo number less than that of the first modulo requirement.

16. The apparatus of claim 11, wherein the first coding constraint comprises a first modulo requirement corresponding in number to a number of data bytes defining the predetermined block size, and the second coding constraint comprises a second modulo requirement corresponding in number to a number of data bytes stored in the last data block.

17. The apparatus of claim 11, wherein the second coding constraint varies relative to the number of data bytes stored in the last data block.

18. The apparatus of claim 11, further comprising a detector that detects a start of the last data block, wherein the decoder, in response to the detector detecting the start of the last data block, discontinues use of the first coding constraint and uses the second coding constraint to decode the last data block.

19. The apparatus of claim 18, wherein the detector detects the start of the last data block by detecting a change of state of a read gate input into the data channel.

20. The apparatus of claim 18, wherein the detector is coupled to a counter, the detector detecting the start of the last data block using a count of data field bytes indicated by the counter.

21. The apparatus of claim 11, further comprising an error correction circuit that produces error correction data, wherein the encoder encodes the last data block to include the error correction data for the last data block.

22. A data storing system, comprising:
- a data storage medium;
- a transducer supported by a support structure in proximity with the medium;
- an actuator that provides relative movement between the transducer and the medium; and
- circuitry for processing information transferred between the transducer and the data storage medium, the circuitry comprising:
  - an encoder for encoding a first plurality of data blocks of a data field according to a first coding constraint for storage on the data storage medium, the data blocks having a predetermined block size and the data field comprising a last data block that can store a number of data bytes fewer than that accommodated by the block size of the last data block, the encoder encoding the last data block according to a second coding constraint for storage on the data storage medium such that no pad bytes are required to complete encoding of the last data block; and
  - a decoder that decodes the first plurality of data blocks transferred from the data storage medium according to the first coding constraint, the decoder decoding the last data block transferred from the data storage medium according to the second coding constraint.

23. The system of claim 22, wherein a subset of circuitry of the encoder encodes the last data block.

24. The system of claim 22, wherein a subset of circuitry of the decoder decodes the last data block.

25. The system of claim 22, wherein the first coding constraint comprises a first modulo requirement and the second coding constraint comprises a second modulo requirement differing from the first modulo requirement.

26. The system of claim 25, wherein the second modulo requirement has an associated modulo number less than that of the first modulo requirement.

27. The system of claim 22, wherein the first coding constraint comprises a first modulo requirement corresponding in number to a number of data bytes defining the predetermined block size, and the second coding constraint comprises a second modulo requirement corresponding in number to a number of data bytes stored in the last data block.

28. The system of claim 22, wherein the second coding constraint varies relative to the number of data bytes stored in the last data block.

29. The system of claim 22, further comprising a detector that detects a start of the last data block, wherein the decoder, in response to the detector detecting the start of the last data block, discontinues use of the first coding constraint and uses the second coding constraint to decode the last data block.

30. The system of claim 29, wherein the detector detects the start of the last data block by detecting a change of state of a read gate input into a data channel of the system.

31. The system of claim 29, wherein the detector comprises a counter, the detector detecting the start of the last data block using a count of data field bytes indicated by the counter to determine the start of the last data block.

32. The system of claim 22, further comprising an error correction circuit that produces error correction data, wherein the encoder encodes the last data block to include the en-or correction data for the last data block.

* * * * *